US012619272B2

(12) United States Patent
Suzuki

(10) Patent No.: US 12,619,272 B2
(45) Date of Patent: May 5, 2026

(54) REFERENCE VOLTAGE GENERATION DEVICE

(71) Applicant: ABLIC Inc., Nagano (JP)

(72) Inventor: Satoshi Suzuki, Nagano (JP)

(73) Assignee: ABLIC Inc., Nagano (JP)

( * ) Notice: Subject to any disclaimer, the term of this patent is extended or adjusted under 35 U.S.C. 154(b) by 184 days.

(21) Appl. No.: 18/617,618

(22) Filed: Mar. 26, 2024

(65) Prior Publication Data

US 2024/0329682 A1 Oct. 3, 2024

(30) Foreign Application Priority Data

Mar. 31, 2023 (JP) ................................ 2023-057979
Jan. 30, 2024 (JP) ................................ 2024-012112

(51) Int. Cl.
*G05F 3/26* (2006.01)

(52) U.S. Cl.
CPC .................................. *G05F 3/262* (2013.01)

(58) Field of Classification Search
CPC ............. G05F 3/24; G05F 3/242; G05F 3/262
See application file for complete search history.

(56) References Cited

U.S. PATENT DOCUMENTS 6,005,378 A * 12/1999 D'Angelo .............. G11C 5/147 323/273
6,087,821 A * 7/2000 Kojima ................... G05F 3/262 323/315
2002/0036488 A1 * 3/2002 Ueda ......................... G05F 3/24 323/313
2007/0057291 A1 * 3/2007 Aota ...................... G11C 5/147 257/213
2013/0207636 A1 * 8/2013 Yoshino ................. H10D 84/83 323/313
2015/0160678 A1 * 6/2015 Kadowaki .............. G05F 3/245 323/313
2019/0244956 A1 * 8/2019 Yoshino .................. G05F 3/242
2020/0192412 A1 * 6/2020 Tsumura ................ H10D 84/84

FOREIGN PATENT DOCUMENTS

JP 2005-134939 5/2005

* cited by examiner

*Primary Examiner* — Alex Torres-Rivera
(74) *Attorney, Agent, or Firm* — JCIPRNET

(57) ABSTRACT

The present invention provides a reference voltage generation device which includes a constant current circuit outputting a constant current in response to an input voltage; a voltage generation circuit connected in series to the constant current circuit, using the constant current as an input current, and generating an output voltage based on the input current; and a reference voltage output port outputting the output voltage. In the constant current circuit, multiple depletion type MOS transistors are connected in series, the gate widths are the same, and the sum of the gate lengths is the total gate length of the constant current circuit. In the voltage generation circuit, multiple enhancement type MOS transistors are connected in series, the gate widths are the same, and the sum of the gate lengths is the total gate length of the voltage generation circuit.

3 Claims, 13 Drawing Sheets

REFERENCE VOLTAGE GENERATION DEVICE

CROSS-REFERENCE TO RELATED APPLICATION

This application claims the priority benefits of Japanese application no. 2023-057979, filed on Mar. 31, 2023, and Japanese application no. 2024-012112, filed on Jan. 30, 2024. The entirety of the above-mentioned patent applications is hereby incorporated by reference herein and made a part of this specification.

BACKGROUND

Technical Field

The present invention relates to a reference voltage generation device.

Description of Related Art

Reference voltage circuits, which are often used in analog processing circuits, are required to output a reference voltage with high stability and have low current consumption.

However, the purpose of the related art is to improve the yield by compensating for the temperature characteristics and correcting the manufacturing process variations.

In order to reduce current consumption, generally, the channel length of the transistors which constitute the reference voltage circuit is increased to suppress the drain current. However, there is a problem that, in the case where the channel length is increased, the electrical characteristics thereof are more likely to be affected by external stress other than the semiconductor chip, such as shrinkage of the resin in the resin sealing formation process in the post-process, which causes the stability of the reference voltage to decrease.

SUMMARY

The present invention provides a reference voltage generation device, including: a constant current circuit which outputs a constant current in response to an input voltage; a voltage generation circuit which is connected in series to the constant current circuit, uses the constant current as an input current, and generates an output voltage based on the input current; and a reference voltage output port which outputs the output voltage, in which the constant current circuit includes a depletion type MOS transistor circuit, and the depletion type MOS transistor circuit has a depletion type MOS transistor circuit total gate width and a depletion type MOS transistor circuit total gate length, the depletion type MOS transistor circuit includes n (n is an integer 2, 3, 4 . . . ) depletion type MOS transistors, the n depletion type MOS transistors, from a first depletion type MOS transistor to an $n^{th}$ depletion type MOS transistor, are connected in series, the first depletion type MOS transistor has a first gate width and a first gate length, and has a gate and a source connected, the $n^{th}$ depletion type MOS transistor has the first gate width and an $n^{th}$ gate length, and has a drain connected to the input voltage, the voltage generation circuit includes an enhancement type MOS transistor circuit, and the enhancement type MOS transistor circuit has an enhancement type MOS transistor circuit total gate width and an enhancement type MOS transistor circuit total gate length, the enhancement type MOS transistor circuit includes m (m is an integer 2, 3, 4 . . . ) enhancement type MOS transistors, the m enhancement type MOS transistors, from a first enhancement type MOS transistor to an $m^{th}$ enhancement type MOS transistor, are connected in series, the first enhancement type MOS transistor has the first gate width and an $\mathbf{E1}^{th}$ gate length, and has a drain and a gate connected, the $m^{th}$ enhancement type MOS transistor has the first gate width and an $\mathbf{E1}^{th}$ gate length, the source of the first depletion type MOS transistor and the drain of the first enhancement type MOS transistor are connected to the reference voltage output port, the first gate width is the depletion type MOS transistor circuit total gate width and the enhancement type MOS transistor circuit total gate width, a sum of the first gate length to the $n^{th}$ gate length is the depletion type MOS transistor circuit total gate length, and a sum of the $\mathbf{E1}^{th}$ gate length to the $\mathbf{E1}^{th}$ gate length is the enhancement type MOS transistor circuit total gate length.

The present invention provides a reference voltage generation device which suppresses current consumption and the influence of external stress.

Problems, configurations, and effects other than those described above will be made clear by the following description of the embodiments.

DESCRIPTION OF THE EMBODIMENTS

Figure 1:
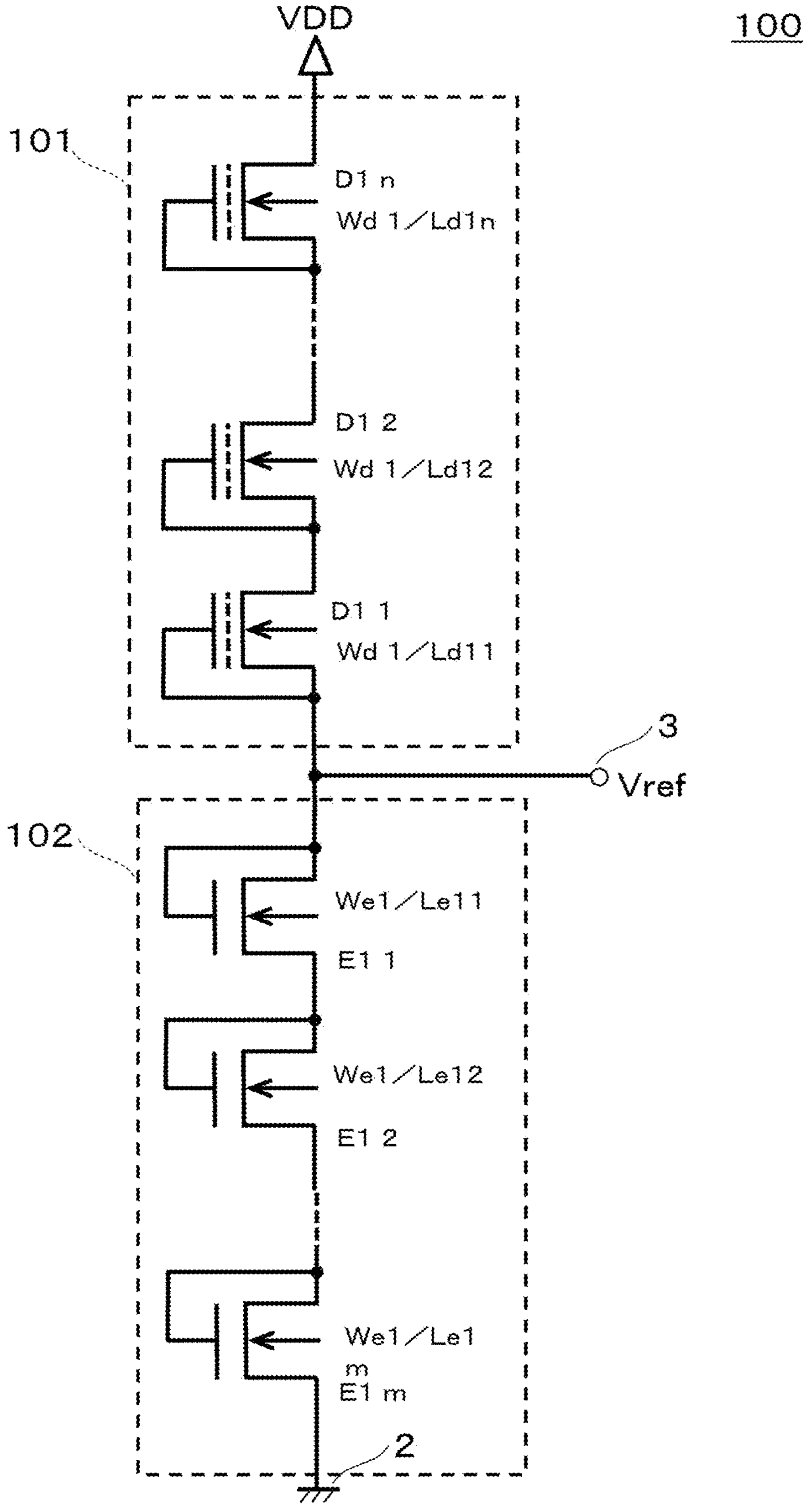
FIG. 1 is a circuit diagram illustrating the reference voltage generation device according to the first embodiment (n=n, m=m) of the present invention.

Embodiments of the present invention will be described in detail hereinafter with reference to the drawings. The drawings used in the following description may be partially omitted in order to make the features of the present invention easier to understand, and may differ from the actual configuration. It should be noted that, in each drawing, the same components are denoted by the same reference numerals, and detailed description of the overlapping parts will be omitted.

Figure 10:
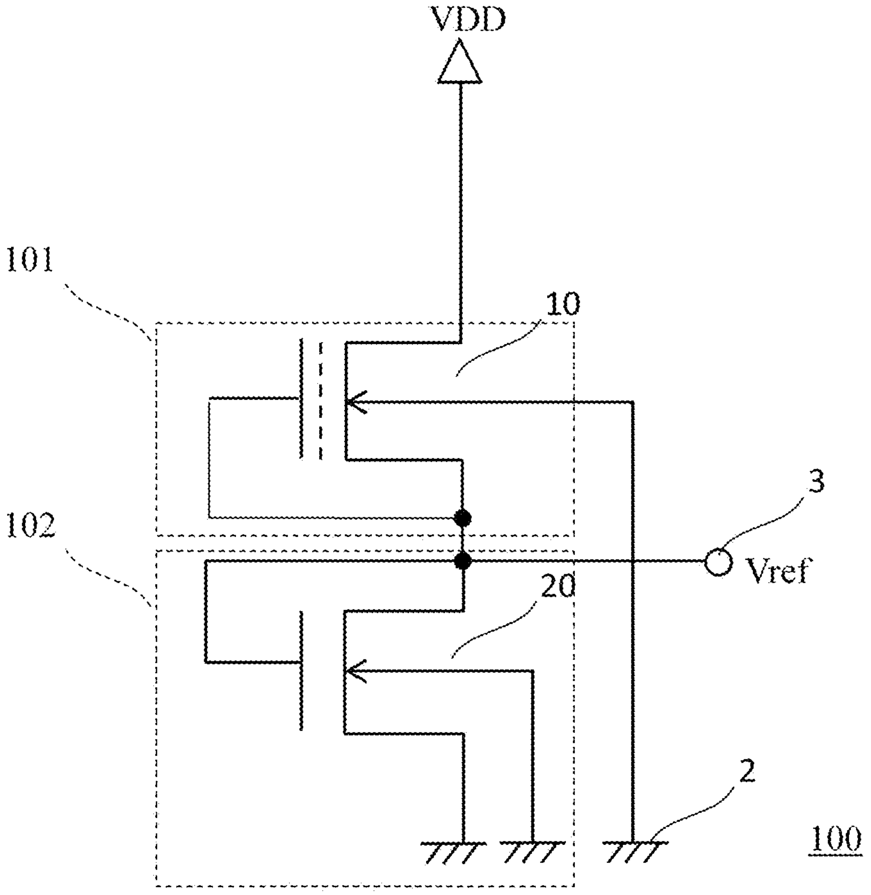
FIG. 10 is a circuit diagram illustrating the reference voltage generation device.
Figure 11:
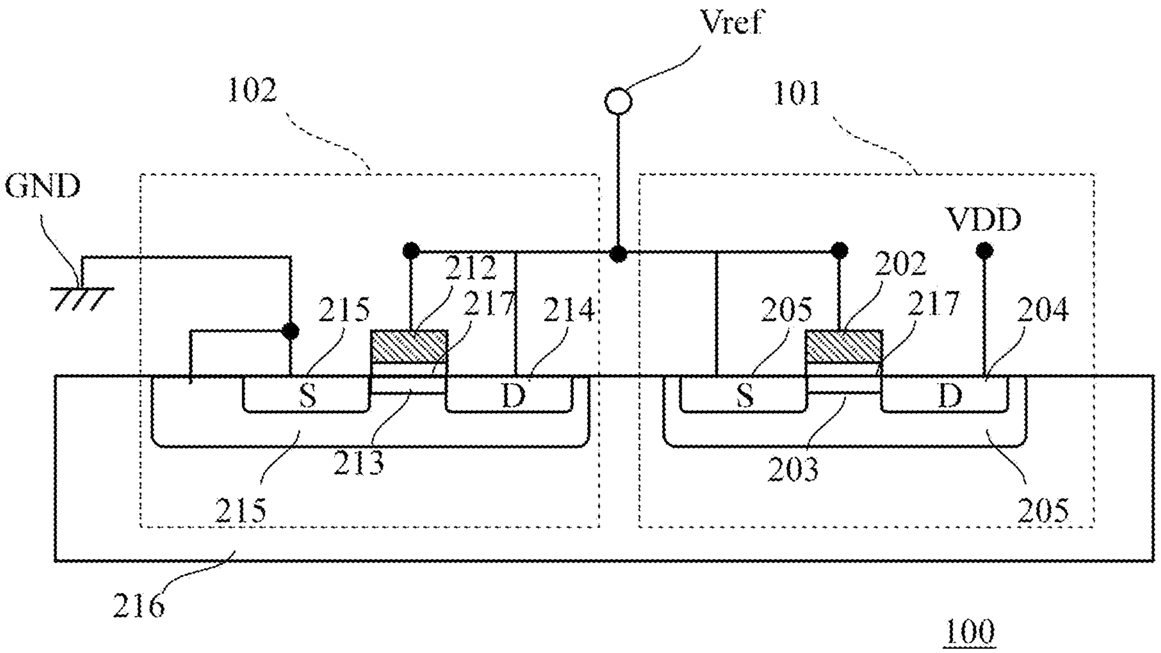
FIG. 11 is a cross-sectional view illustrating the reference voltage generation device.

FIG. 10 is a circuit diagram illustrating a reference voltage generation device 100 according to an embodiment of the present invention.

In an analog processing circuit, the output characteristics such as output voltage and current are determined by the electrical characteristics of the transistors which constitute the analog processing circuit. For example, the reference voltage generation device 100 includes a depletion type NMOS transistor 101 which outputs a constant current, and an enhancement type NMOS transistor which outputs a voltage according to the constant current value. Then, the reference voltage Vref output by the reference voltage generation device is determined by the electrical characteristics such as the threshold voltages and mutual conductance of the depletion type NMOS transistor and the enhancement type NMOS transistor.

The analog processing circuit is required to constantly maintain stable characteristics against various external fluctuations. A typical factor of the external fluctuations is temperature, and it is desirable that the MOS transistors constituting the analog processing circuit have electrical fluctuations with respect to temperature which are sufficiently small compared to a permissible value. Furthermore, in the case where the temperature fluctuation of a MOS transistor exceeds a permissible value, a circuit device is used to cancel out the temperature fluctuation of each MOS transistor and suppress the temperature fluctuation as an output characteristic.

In recent years, an external factor which has become more prominent in addition to temperature fluctuations is stress applied from the outside. For example, in the case where a semiconductor chip including an analog processing circuit is sealed with thermosetting resin, shrinkage stress is applied to the semiconductor chip during curing according to the linear expansion coefficient of the thermosetting resin. The semiconductor chip is made of semiconductor materials such as silicon, but since these materials have different linear expansion coefficients, stress is generated due to the difference in shrinkage between these materials and the thermosetting resin. This stress generates strain in the channel within the transistor made of silicon, causing fluctuations in the characteristics of the transistor due to the piezoresistive effect of silicon. Thus, electrical trimming may be performed on a semiconductor device completed through a resin sealing process in order to adjust the output characteristics of the analog processing circuit.

The inventors have found a technique which is capable of suppressing the influence on a MOS transistor in the case where a semiconductor chip receives external stress. Based on this technique, an analog processing circuit is achieved which suppresses characteristic fluctuations against stress. This technique will be described below.

Fluctuations in the characteristics of silicon due to stress generally include fluctuations in impurity concentration due to changes in band gap and fluctuations in carrier mobility due to changes in inter-lattice distance. In many cases, a large amount of impurity is implanted into silicon during manufacturing, so the electrical characteristics of a MOS transistor are greatly affected by fluctuations in mobility.

Figure 9:
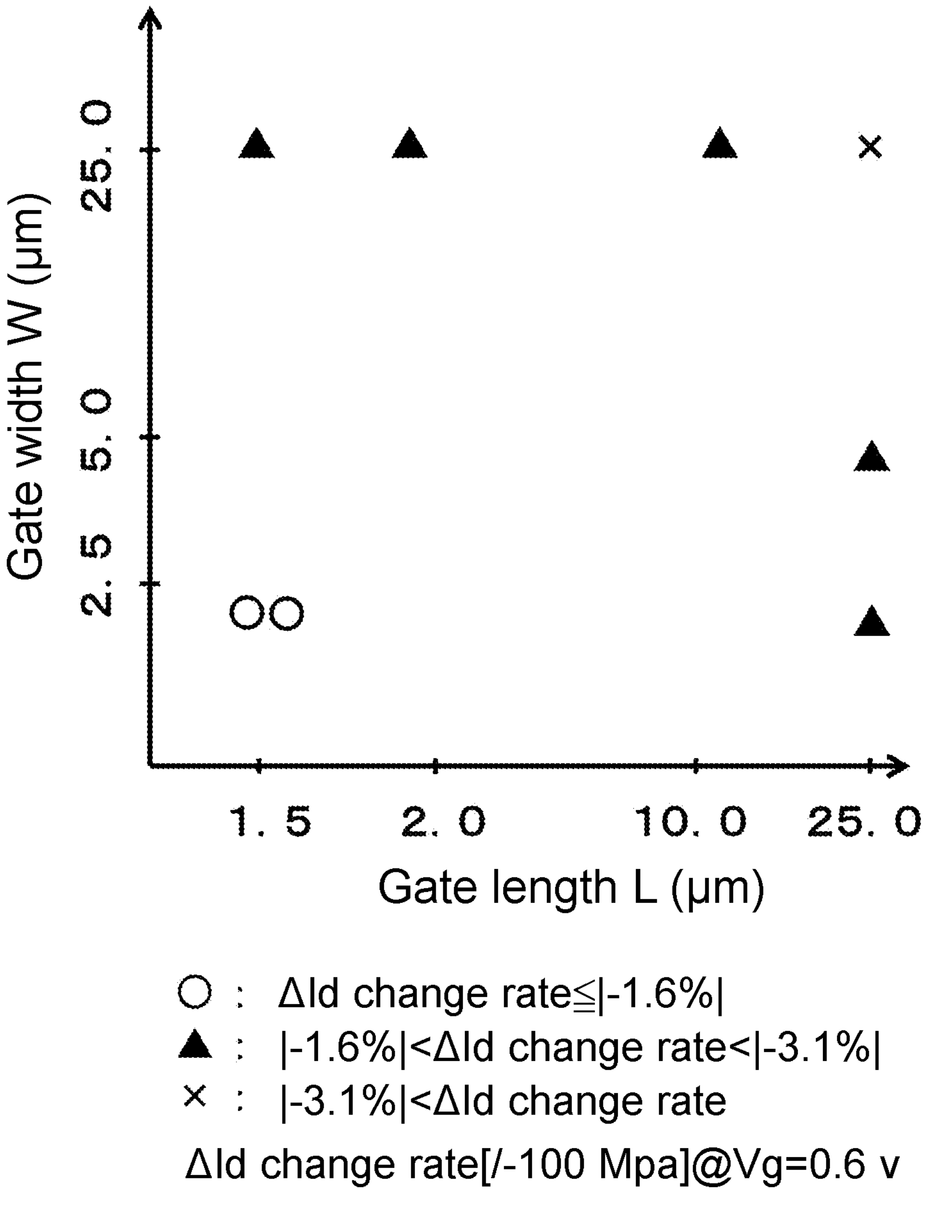
FIG. 9 is a diagram illustrating the relationship between changes in drain current due to the influence of stress, and the gate width and gate length of the transistor.

With respect to the drain current which is greatly affected by mobility in the electrical characteristics of a MOS transistor, FIG. 9 illustrates an overview of the amount of variation (ΔId) in the drain current at the time when constant stress (100 Mpa) is applied as a change rate in the amount of variation of the drain current (ΔId change rate/[−100 Mpa]) of the MOS transistor at a gate voltage of 0.6 V with the channel length L (horizontal axis) and channel width W (vertical axis) of the MOS transistor as parameters.

In FIG. 9, the symbol ○ indicates that the ΔId change rate is less than or equal to the absolute value |−1.6%|. The symbol ▲ indicates that the ΔId change rate is greater than the absolute value |−1.6%| and less than the absolute value |−3.1%|. The x symbol indicates that the ΔId change rate is greater than the absolute value |−3.1%|.

More specifically, in the case where the gate width W is 5 μm or less and the gate length is 25 μm or less, the change rate in the amount of variation of the drain current (ΔId change rate/[−100 Mpa]) is less than the absolute value |−3.1%|. Further, in the case where the gate width W is 2.5 μm or less and the gate length is 1.5 μm or less, the change rate in the amount of variation of the drain current (ΔId change rate/[−100 Mpa]) is less than or equal to the absolute value |−1.6%|. In other words, it can be seen that the smaller the channel length L (μm) and channel width W (μm), that is, the channel size of the MOS transistor, the smaller the fluctuation rate of the drain current amount due to stress.

Thus, it can be seen that the influence of stress can be greatly reduced by combining MOS transistors with small channel sizes to form a channel size comparable to the channel size of transistors with large channel sizes.

Example 1

A reference voltage generation device according to the first embodiment of the present invention will be described with reference to FIG. 1 to FIG. 3.

As illustrated in FIG. 1, the reference voltage generation device of this embodiment is a reference voltage generation device 100 including: a constant current circuit 101 which outputs a constant current in response to an input voltage VDD; a voltage generation circuit 102 which is connected in series to the constant current circuit 101, uses the constant current as an input current, and generates an output voltage based on the input current; and a reference voltage output port 3 which outputs the output voltage. The constant current circuit 101 includes a depletion type NMOS transistor circuit, and the transistor size of the depletion type NMOS transistor circuit is a total gate width Wd and a total gate length Ld. Further, the constant current circuit 101 includes n depletion type NMOS transistors connected in series from depletion type MOS transistors D11 to D1$n$, the depletion type NMOS transistor D11 has a gate and a source connected, and the source is connected to the reference voltage output port 3.

The depletion type NMOS transistor D1*n* has a drain connected to the input voltage VDD, and a source connected to a drain of the depletion type NMOS transistor D1*n*−1. The gate widths of the depletion type NMOS transistor D11 to the depletion type NMOS transistor D1*n* are the same gate width Wd1, and the gate lengths are Ld11, Ld12, Ld13, . . . . Ld1*n*, respectively.

Further, the gates of the depletion type NMOS transistor D11 to the depletion type NMOS transistor D1*n* are connected to the sources of the depletion type NMOS transistors, and the p-well potential is connected to a common potential.

The voltage generation circuit 102 includes an enhancement type NMOS transistor circuit, and the transistor size of the enhancement type NMOS transistor circuit is a total gate width We and a total gate length Le.

Then, the voltage generation circuit 102 includes m enhancement type NMOS transistors connected in series from enhancement type NMOS transistors E11 to E1*m*, the enhancement type NMOS transistor E11 has a gate and a drain connected, and the drain is connected to the reference voltage output port 3. The enhancement type NMOS transistor E1*m* has a source connected to a ground terminal 2, and a drain connected to the source of the enhancement type NMOS transistor E1*m*−1.

The gate widths of the enhancement type NMOS transistor E11 to the enhancement type NMOS transistor E1*m* are the same gate width We1, and the gate lengths are Le11, Le12, Le13, . . . Le1*m*, respectively. Further, the gates of the enhancement type NMOS transistor E11 to the enhancement type NMOS transistor E1*m* are connected to the drains of the enhancement type NMOS transistors, and the p-well potential is connected to the common potential.

The total gate width Wd of the depletion type NMOS transistor circuit, the gate width Wd1 of the depletion type NMOS transistor, the total gate width We of the enhancement type NMOS transistor circuit, and the gate width We1 of the enhancement type NMOS transistor are equal (Wd=Wd1=We=We1).

The total gate length Ld of the depletion type NMOS transistor circuit is equal to the sum of the gate lengths (Ld11, Ld12, Ld13, . . . . Ld1*n*) of the depletion type NMOS transistors (Ld=Ld11+Ld12+Ld13+ . . . +Ld1*n*).

The total gate length Le of the enhancement type NMOS transistor circuit is equal to the sum of the gate lengths (Le11, Le12, Le13, . . . . Le1*m*) of the enhancement type NMOS transistors (Le=Le11+Le12+Le13+ . . . +Le1*m*).

Then, in the case where the gate width Wd1 of the depletion type NMOS transistor and the gate width We1 of the enhancement type NMOS transistor are set to 5 μm or less, and the gate length of the depletion type NMOS transistor (Ld11, Ld12, Ld13, . . . . Ld1*n*) and the gate length of the enhancement type NMOS transistor (Le11, Le12, Le13, . . . . Le1*m*) are set to 25 μm or less, since the fluctuation rate in the drain current amount of each MOS transistor due to the influence of external stress is reduced, the reference voltage generation device is capable of suppressing power consumption and suppressing the influence of external stress.

In a specific reference voltage generation device, in the case where the total gate width Wd of the depletion type NMOS transistor circuit is 5 μm, the total gate length Ld is 100 μm, the total gate width We of the enhancement type NMOS transistor circuit is 5 μm, and the total gate length Le is 75 μm, the gate width Wd=Wd1=We=We1=5 μm, and if the depletion type NMOS transistor circuit is set to n=4, the gate length Ld11=Ld12=Ld13=Ld14=25 μm, the enhancement type NMOS transistor circuit is set to m=3, and the gate length Le11=Le12=Le13=25 μm, the reference voltage generation device is capable of suppressing power consumption and suppressing the influence of external stress.

In the case of further suppressing the influence of external stress, the gate length may be set so that the depletion type NMOS transistor circuit is set to n=50, the gate length Ld11=Ld12=Ld13 . . . =Ld150=2 μm, the enhancement type NMOS transistor circuit is set to m=38, and the gate length Le11=Le12=Le13 . . . =Le137=2 μm and Le138=1 μm.

Figure 2:
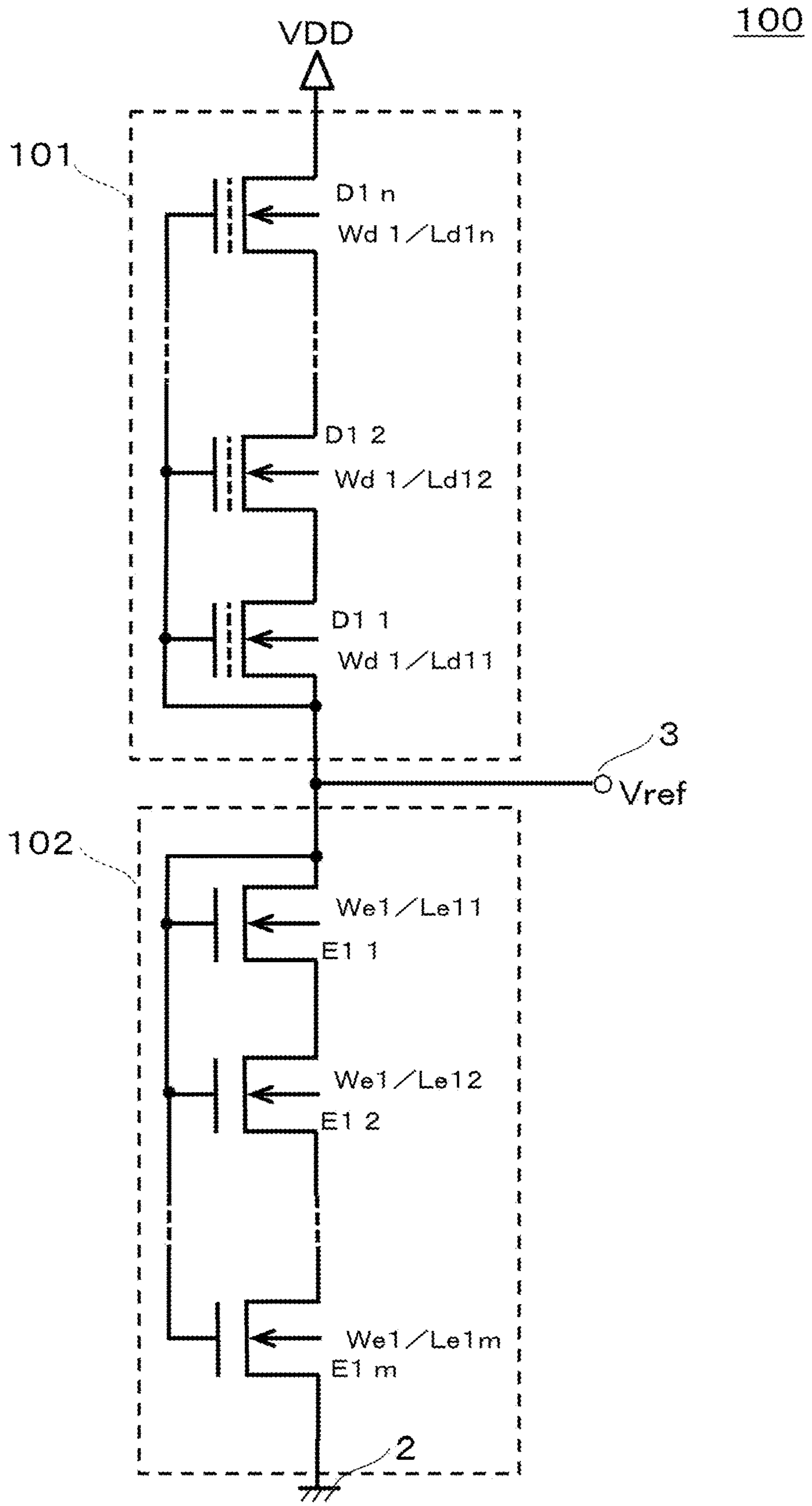
FIG. 2 is a circuit diagram illustrating the reference voltage generation device according to a modified example of the first embodiment (n=n, m=m) of the present invention.

As a modification of the first embodiment, FIG. 2 illustrates a reference voltage generation device in which the gates of the depletion type NMOS transistor D11 to the depletion type NMOS transistor D1*n* are commonly connected, and the gates of the enhancement type NMOS transistor E11 to the enhancement type NMOS transistor E1*m* are commonly connected.

Figure 3:
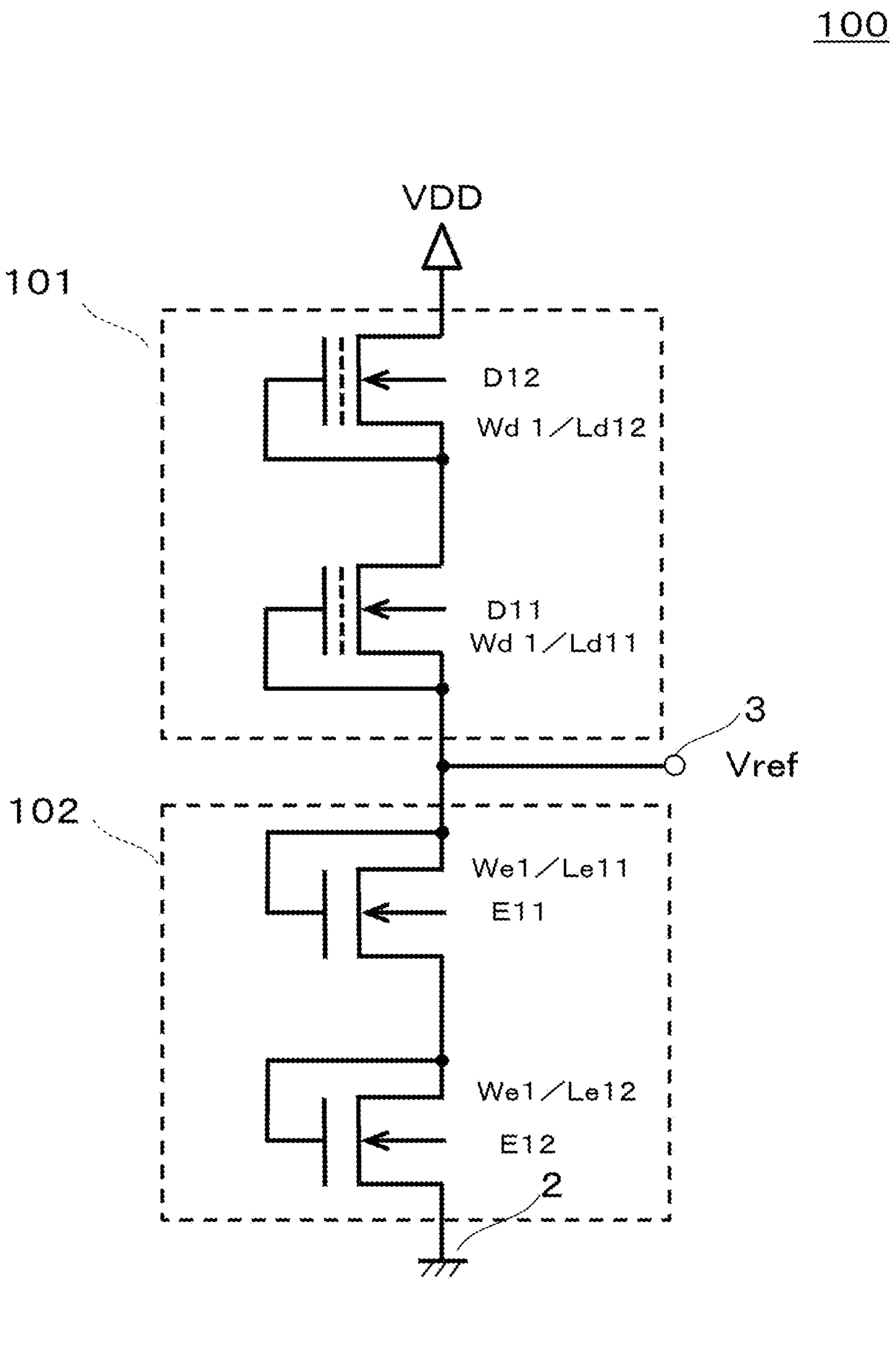
FIG. 3 is a circuit diagram illustrating the reference voltage generation device according to the first embodiment (n=2, m=2) of the present invention.

FIG. 3 illustrates a reference voltage generation device in the case of n=2 and m=2 according to the first embodiment. In this case, the gate width Wd=Wd1=We=We1=5 μm, the gate length of the depletion type NMOS transistor Ld11=Ld12=25 μm, the gate length of the enhancement type NMOS transistor Le11=Le12=25 μm. The gate length may be further reduced.

Example 2

A reference voltage generation device 200 according to the second embodiment of the present invention will be described with reference to FIG. 4 to FIG. 8.

Figure 4:
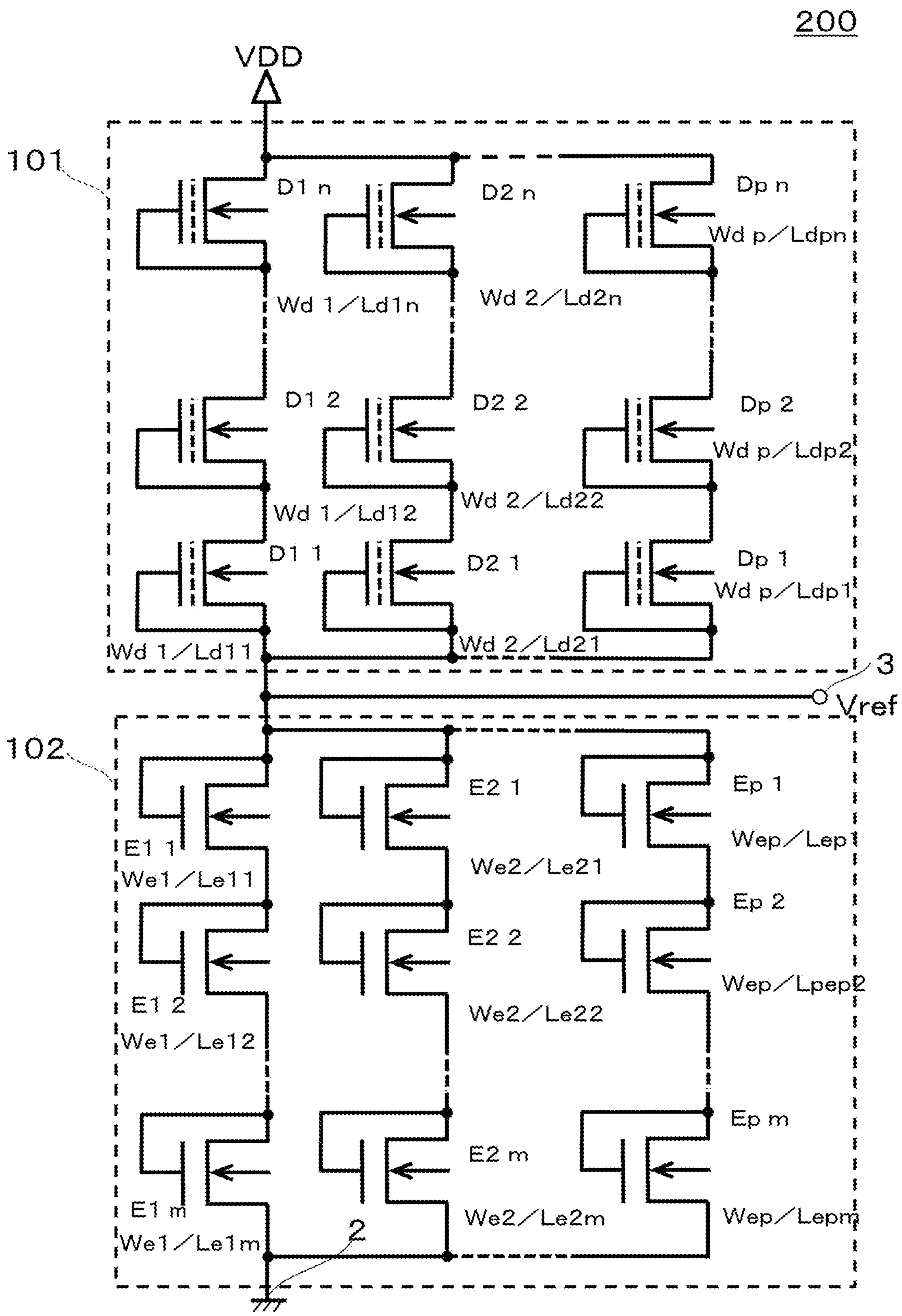
FIG. 4 is a circuit diagram illustrating the reference voltage generation device according to the second embodiment (n=n, m=m, p=p) of the present invention.

In FIG. 4, in addition to the depletion type NMOS transistors D11 to D1*n* connected in series to the first column of the constant current circuit 101 and the enhancement type NMOS transistors E11 to E1*m* connected in series to the first column of the voltage generation circuit 102 in the configuration of FIG. 1, the constant current circuit 101 connects a second column, a third column, . . . a $p^{th}$ column (p is an integer of 2 or more) in parallel to the n depletion type NMOS transistors D11 to D1*n* connected in series in the first column. The second column includes n depletion type NMOS transistors D21 to D2*n* connected in series. The $p^{th}$ column includes n depletion type NMOS transistors Dp1 to Dpn connected in series. Each of the depletion type NMOS transistors D11 to D1*n*, D21 to D2*n*, . . . . Dp1 to Dpn has a gate and a source connected. The source of each of the depletion type NMOS transistors D11, D21, . . . . Dp1 in the first row is connected to the reference voltage output port 3. The drain of each of the depletion type NMOS transistors D1*n*, D2*n*, . . . . Dpn in the $n^{th}$ row is connected to the input voltage VDD.

The voltage generation circuit 102 connects a second column, a third column, . . . a $p^{th}$ column (p is an integer of 2 or more) in parallel to the m enhancement type NMOS transistors E11 to E1*m* connected in series in the first column. The second column includes m enhancement type NMOS transistors E21 to E2*m* connected in series. The $p^{th}$ column includes m enhancement type NMOS transistors Ep1 to Epm connected in series. Each of the enhancement type NMOS transistors E11 to E1*m*, E21 to E2*m*, . . . . Ep1 to Epm has a gate and a drain connected. The drain of each of the enhancement type NMOS transistors E11, E21, . . . . Ep1 in the first row is connected to the reference voltage output port 3. The source of each of the enhancement type NMOS transistors E1*m*, E2*m*, . . . . Epm in the $m^{th}$ row is connected to the ground terminal 2.

The gate widths of the depletion type NMOS transistor Dp1 to the depletion type NMOS transistor Dpn are the same gate width Wdp, and the gate lengths are the same gate length corresponding to the depletion type NMOS transistor in the first column (Ld11=Ld21= . . . =Ldp1, Ld12=Ld22= . . . =Ldp2, Ld1*n*=Ld2*n*= . . . =Ldpn).

The gate widths of the enhancement type NMOS transistor Ep1 to the enhancement type NMOS transistor Epm are the same gate width Wep, and the gate lengths are the same gate length corresponding to the enhancement type NMOS transistor in the first column (Le11=Le21= . . . =Lep1, Le12=Le22= . . . =Lep2, Le13=Le23= . . . =Lep3 . . . , Le1*m*=Le2*m*= . . . =Lepm).

The transistor size of the depletion type NMOS transistor circuit is a total gate width Wd and a total gate length Ld, and the transistor size of the enhancement type NMOS transistor circuit is a total gate width We and a total gate length Le.

In the case where the gate widths of the depletion type NMOS transistors from the first column to the $p^{th}$ column are Wd1, Wd2, . . . . Wdp and the gate widths of the enhancement type NMOS transistors are We1, We2, . . . . Wep, the total gate width Wd of the depletion type NMOS transistor circuit is set to the sum of the gate widths Wd1, Wd2, . . . . Wdp of the depletion type NMOS transistors from the first column to the $p^{th}$ column (Wd=Wd1+Wd2+ . . . +Wdp).

The total gate width We of the enhancement type NMOS transistor circuit is set to the sum of the gate widths We1, We2, . . . . Wep of the enhancement type NMOS transistors from the first column to the $p^{th}$ column (We=We1+We2+ . . . +Wep).

The total gate length Ld of the depletion type NMOS transistor circuit is set to the sum of the gate lengths of the depletion type NMOS transistors in the first column.

Further, the total gate length Le of the enhancement type NMOS transistor circuit is set to the sum of the gate lengths of the enhancement type NMOS transistors in the first column.

Then, in the case where the gate widths of the depletion type NMOS transistors (Wd1, Wd2, . . . . Wdp) and the gate widths of the enhancement type NMOS transistors (We1, We2, . . . . Wep) are set to 5 μm or less, the gate lengths of the depletion type NMOS transistors (Ld11, Ld12, Ld13, . . . . Ld1*n*) (Ld21, Ld22, Ld23, . . . . Ld2*n*) . . . (Ldp1, Ldp2, Ldp3, . . . . Ldpn) and the gate lengths of the enhancement type NMOS transistors (Le11, Le12, Le13, . . . . Le1*m*) (Le21, Le22, Le23, . . . . Le2*m*) . . . (Lep1, Lep2, Lep3, . . . . Lepm) are set to 25 μm or less, since the fluctuation rate in the drain current amount of each MOS transistor due to the influence of external stress is reduced, the reference voltage generation device is capable of suppressing power consumption and suppressing the influence of external stress.

In a specific reference voltage generation device, in the case where the total gate width Wd of the depletion type NMOS transistor circuit is 5 μm, the total gate length Ld is 100 μm, the total gate width We of the enhancement type NMOS transistor circuit is 5 μm, and the total gate length Le is 75 μm, the depletion type NMOS transistor circuit is set to p=2, n=4, and the gate width of the depletion type NMOS transistors Wd1=Wd2=2.5 μm. The total gate width Wd=Wd1+Wd2=5 μm. The gate length Ld11=Ld12=Ld13=Ld14=25 μm. The total gate length Ld=Ld11+Ld12+Ld13+Ld14=100 μm. The enhancement type NMOS transistor circuit is set to p=2, m=3, and the gate width We1=We2=2.5 μm. The total gate width We=We1+We2=5 μm. The gate length Le11=Le12=Le13=25 μm. In the case where the total gate length Le=Le11+Le12+Le13=75 μm, the reference voltage generation device is capable of suppressing power consumption and suppressing the influence of external stress.

In the case of further suppressing the influence of external stress, the gate length may be set so that the depletion type NMOS transistor circuit is set to n=50, the gate length Ld11=Ld12=Ld13 . . . =Ld150=2 μm, the enhancement type NMOS transistor circuit is set to m=38, and the gate length Le11=Le12=Le13 . . . =Le137=2 μm and Le138=1 μm.

Figure 5:
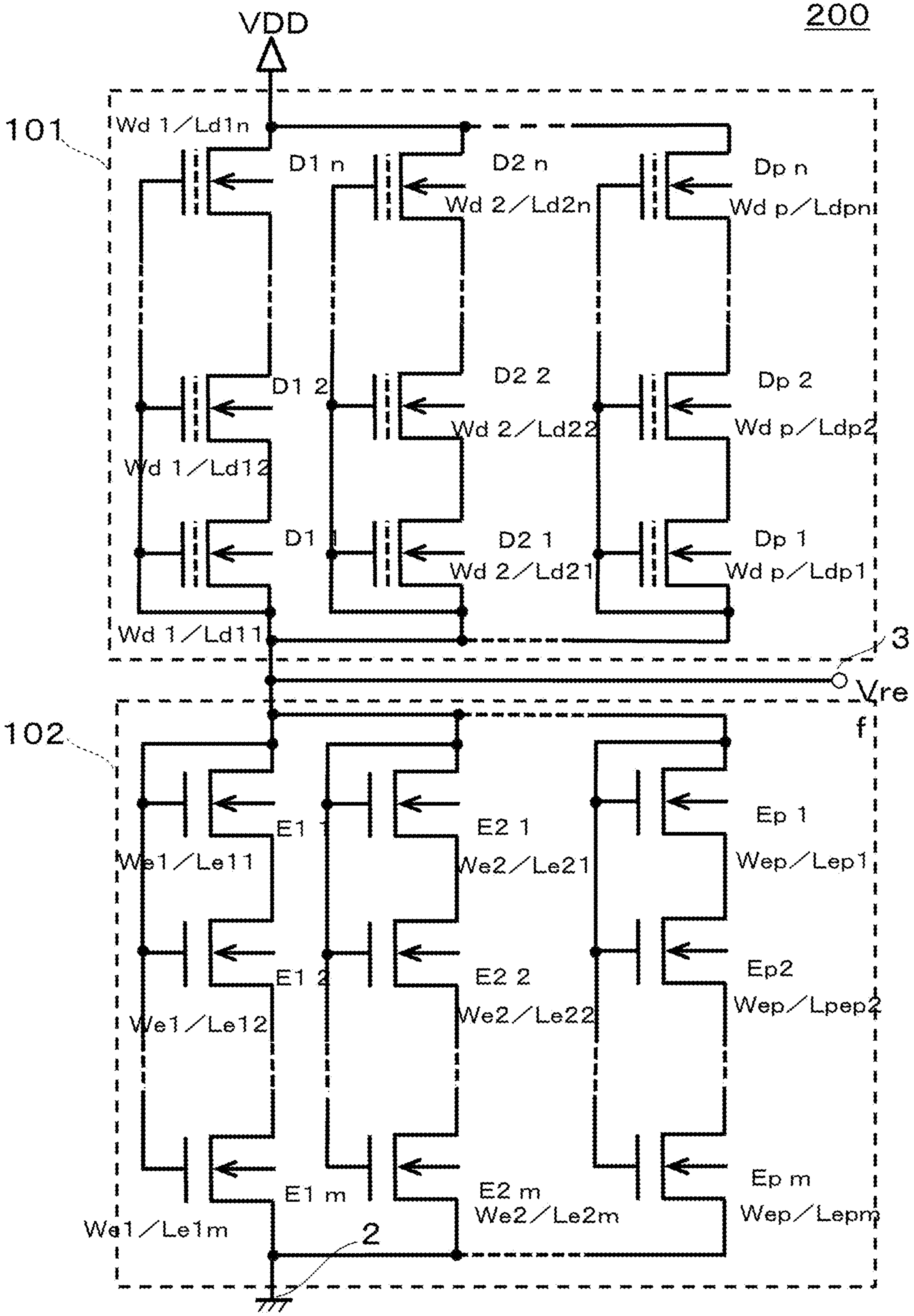
FIG. 5 is a circuit diagram illustrating the reference voltage generation device according to a modified example of the second embodiment (n=n, m=m, p=p) of the present invention.

As a modification of the second embodiment, FIG. 5 illustrates a reference voltage generation device in which the depletion type NMOS transistors D11 to D1*n* in the first column, D21 to D2*n* in the second column, . . . . Dp1 to Dpn in the $p^{th}$ column in the constant current circuit 101 of FIG. 4 have the gates commonly connected in the respective columns, and the enhancement type NMOS transistors E11 to E1*m* in the first column, E21 to E2*m* in the second column, . . . . Ep1 to Epm in the $p^{th}$ column in the voltage generation circuit 102 of FIG. 4 have the gates commonly connected in the respective columns.

The other configurations are the same as in the second embodiment.

Figure 6:
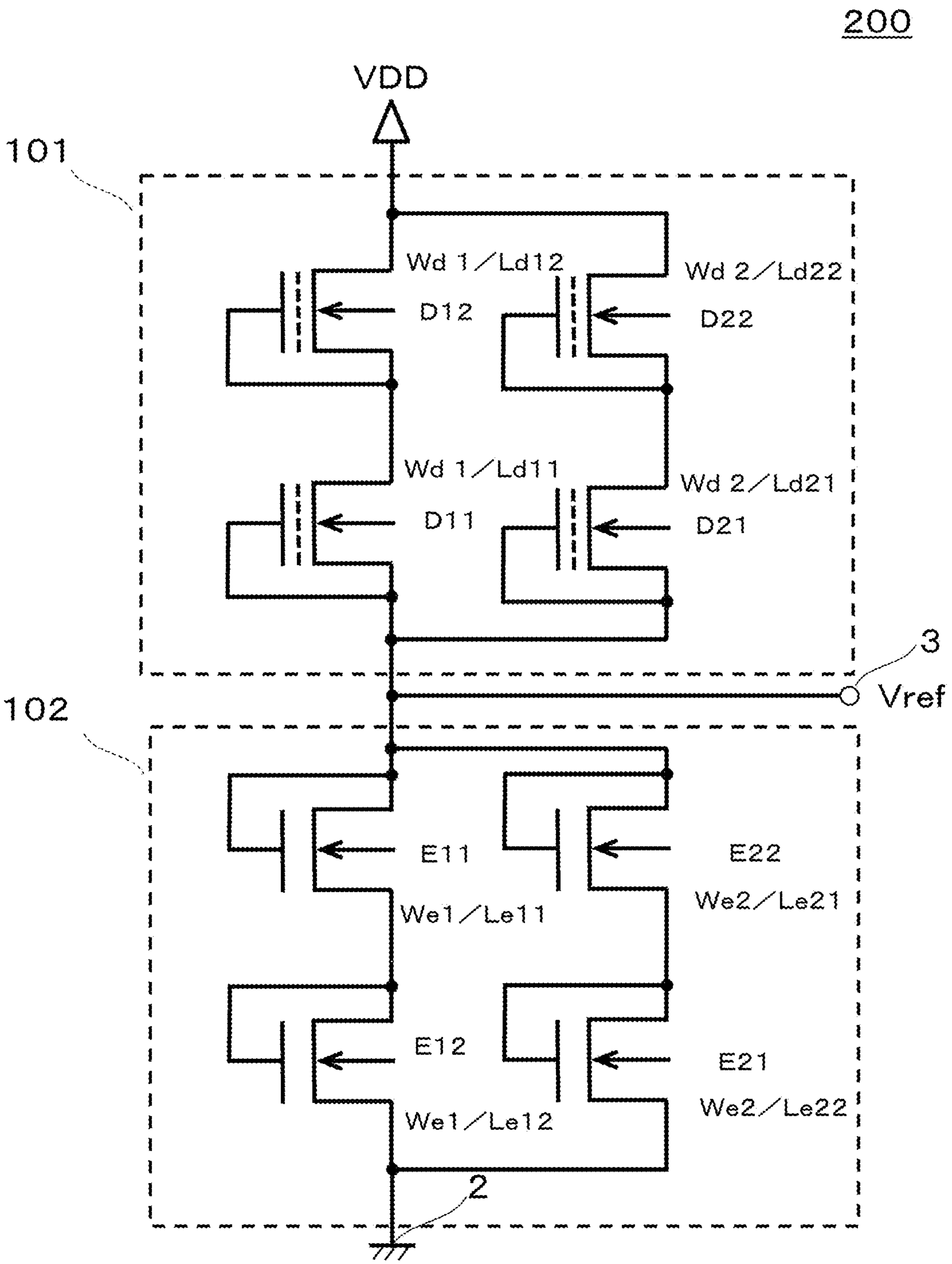
FIG. 6 is a circuit diagram illustrating the reference voltage generation device according to the second embodiment (n=2, m=2, p=2) of the present invention.

FIG. 6 illustrates a reference voltage generation device in the case of n=2, m=2, and p=2 according to the second embodiment.

The other configurations are the same as in the second embodiment.

Figure 7:
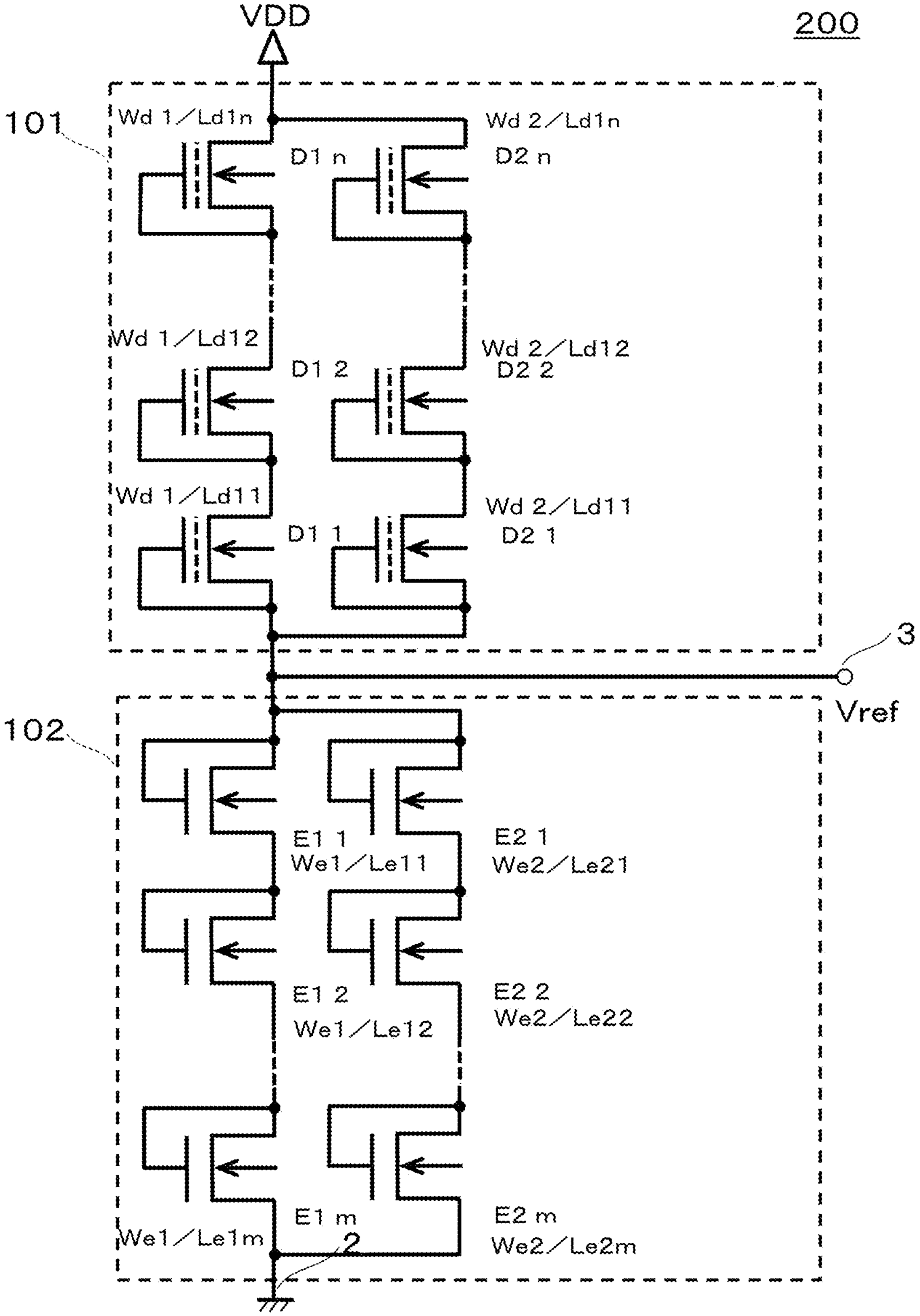
FIG. 7 is a circuit diagram illustrating the reference voltage generation device according to the second embodiment (n=n, m=m, p=2) of the present invention.

FIG. 7 illustrates a reference voltage generation device according to the second embodiment (n=n, m=m, p=2).

The other configurations are the same as in the second embodiment.

Figure 8:
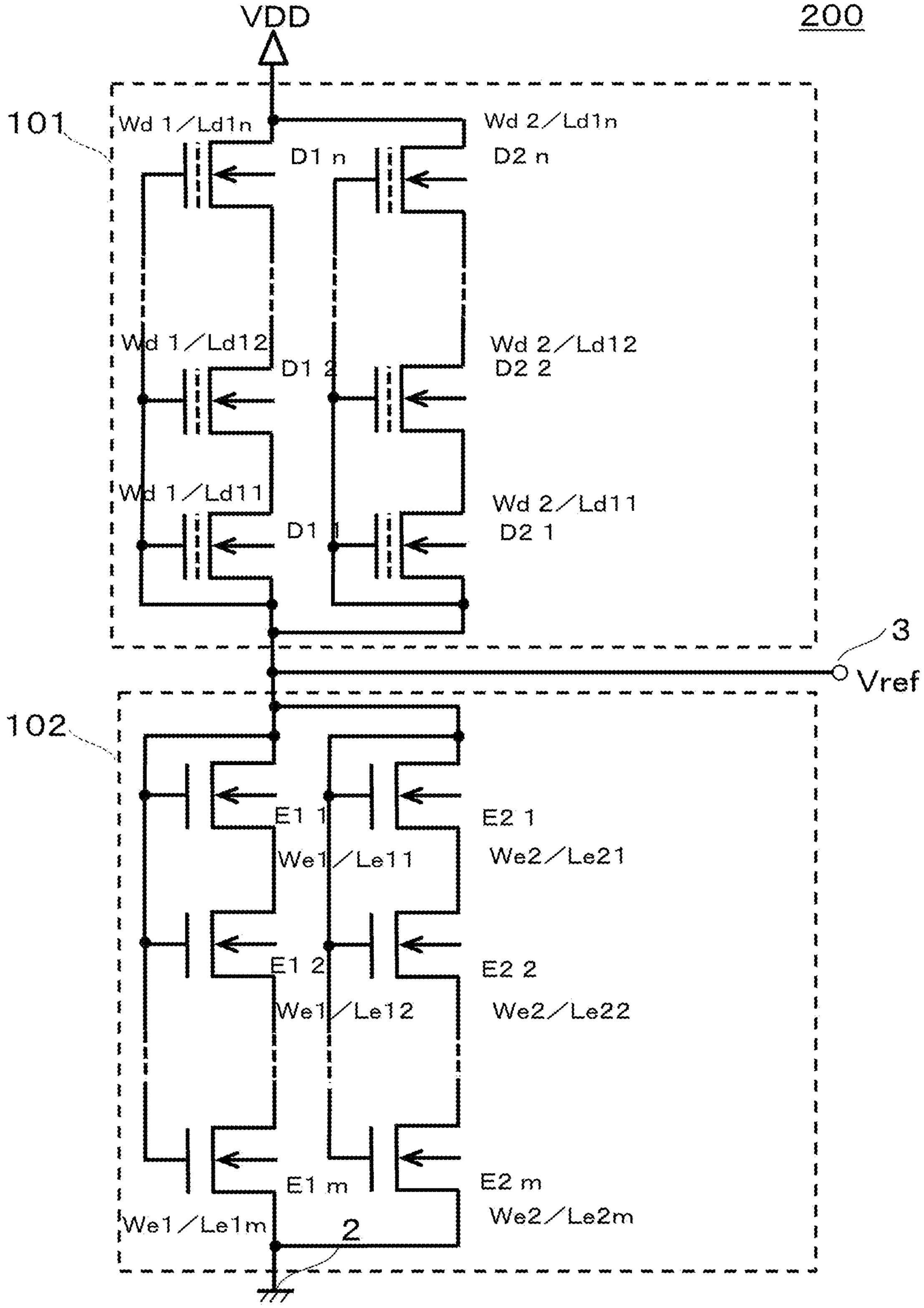
FIG. 8 is a circuit diagram illustrating the reference voltage generation device according to a modified example of the second embodiment (n=n, m=m, p=2) of the present invention.

FIG. 8 illustrates a reference voltage generation device according to a modified example of the second embodiment (n=n, m=m, p=2).

The other configurations are the same as in the second embodiment.

Example 3

A reference voltage generation device 300 according to the third embodiment of the present invention will be described with reference to FIG. 12.

Figure 12:
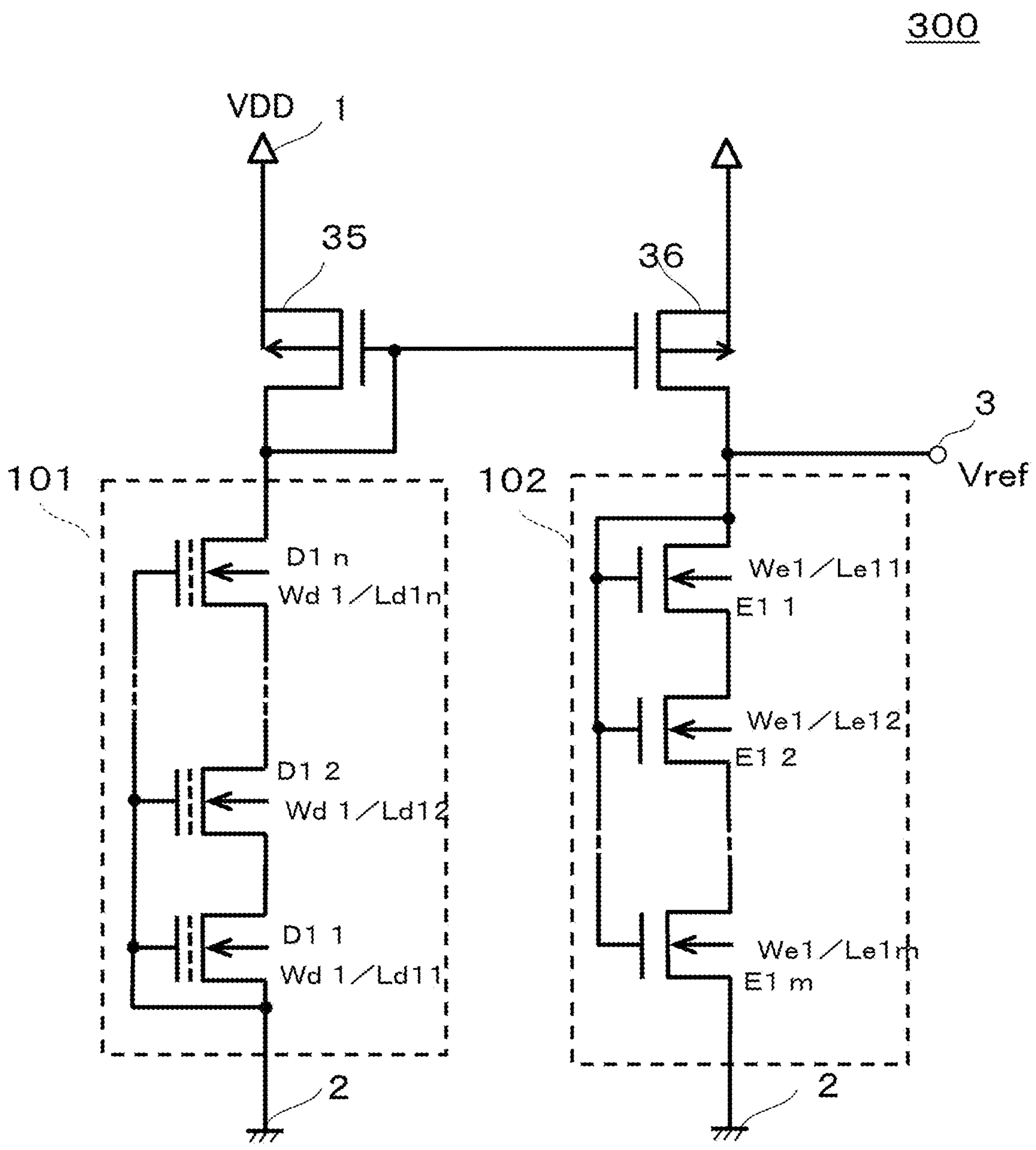
FIG. 12 is a circuit diagram illustrating the reference voltage generation device according to the third embodiment of the present invention.

In FIG. 12, a first PMOS transistor 35 and a second PMOS transistor 36 have the respective gates commonly connected, and the respective sources connected to a power supply terminal 1 (input voltage VDD). The commonly connected gates are connected to the drain of the first PMOS transistor 35, thereby forming a current mirror circuit.

The drain of the first PMOS transistor 35 is connected to the constant current circuit 101, and the drain of the second PMOS transistor 36 is connected to the voltage generation circuit 102 and the reference voltage terminal 3.

The constant current circuit 101 includes a depletion type NMOS transistor circuit. In the depletion type NMOS transistor circuit, n depletion type NMOS transistors are connected in series from D11 to D1*n*, the gates of D11 to D1*n* are commonly connected, the drain of the depletion type NMOS transistor D1*n* is connected to the drain of the first PMOS transistor 35, and the source of the depletion type NMOS transistor D11 is connected to the ground terminal 2.

The voltage generation circuit 102 includes an enhancement type NMOS transistor circuit. In the enhancement type NMOS transistor circuit, m enhancement type NMOS transistors are connected in series from E11 to E1m, the gates of E11 to E1m are commonly connected, the drain of the enhancement type NMOS transistor E11 is connected to the drain of the second PMOS transistor 36 and the reference voltage terminal 3, and the source of the enhancement type NMOS transistor E1m is connected to the ground terminal 2.

Then, the current of the depletion type NMOS transistor circuit of the constant current circuit 101 is passed through the current mirror circuit formed by the first PMOS transistor 35 and the second PMOS transistor 36 to the enhancement type NMOS transistor circuit of the voltage generation circuit 102, and the current of the constant current circuit 101 is received by the voltage generation circuit 102 to generate the reference voltage Vref at the reference voltage terminal 3, which is the same as in FIG. 1 to FIG. 11.

The other configurations are the same as in the first embodiment.

In addition, although not illustrated, in the case where the depletion type NMOS transistor circuit of the constant current circuit 101 and the enhancement type NMOS transistor circuit of the voltage generation circuit 102 are set to n=1, m=1, the source and back gate of the depletion type NMOS transistor D11 can be connected to the ground terminal 2, and the source and back gate of the enhancement type NMOS transistor E11 can be connected to the ground terminal 2 to form the reference voltage generation device of the present invention.

Example 4

A reference voltage generation device 400 according to the fourth embodiment of the present invention will be described with reference to FIG. 13.

Figure 13:
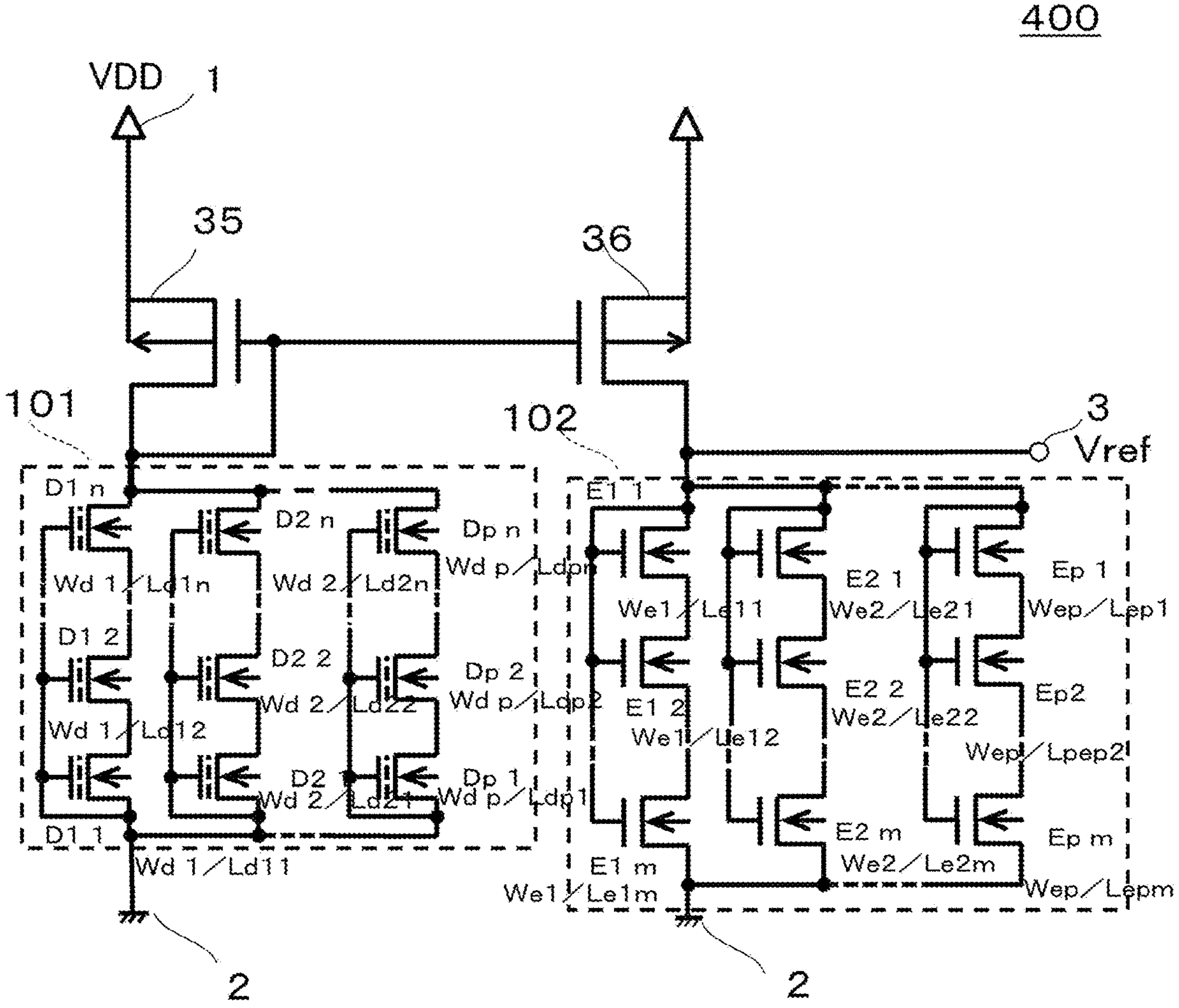
FIG. 13 is a circuit diagram illustrating the reference voltage generation device according to the fourth embodiment of the present invention.

FIG. 13 illustrates a reference voltage generation device in which the depletion type NMOS transistor circuit of the constant current circuit 101 and the enhancement type NMOS transistor circuit of the voltage generation circuit 102 in the reference voltage generation device 300 according to the third embodiment of the present invention are respectively formed by the depletion type NMOS transistor circuit of the constant current circuit 101 and the enhancement type NMOS transistor circuit of the voltage generation circuit 102 illustrated in FIG. 5.

That is, the constant current circuit 101 of the reference voltage generation device 400 according to the fourth embodiment of the present invention connects a second column, a third column, . . . a $p^{th}$ column (p is an integer of 2 or more) in parallel to the n depletion type NMOS transistors D11 to D1n connected in series in the first column. The second column includes n depletion type NMOS transistors D21 to D2n connected in series. The $p^{th}$ column includes n depletion type NMOS transistors Dp1 to Dpn connected in series. The depletion type NMOS transistors D11 to D1n in the first column, D21 to D2n in the second column, . . . . Dp1 to Dpn in the $p^{th}$ column have the gates commonly connected in the respective columns. The voltage generation circuit 102 connects a second column, a third column, . . . a $p^{th}$ column (p is an integer of 2 or more) in parallel to the m enhancement type NMOS transistors E11 to E1m connected in series in the first column. The second column includes m enhancement type NMOS transistors E21 to E2m connected in series. The $p^{th}$ column includes m enhancement type NMOS transistors Ep1 to Epm connected in series. The enhancement type NMOS transistors E11 to E1m, E21 to E2m, . . . . Ep1 to Epm have the gates commonly connected in the respective columns.

The other configurations are the same as in the second embodiment.

Additionally, the constant current circuit 101 and the voltage generation circuit 102 of the reference voltage generation device 400 may have the configurations illustrated in FIG. 1, FIG. 3, FIG. 4, FIG. 6, FIG. 7, and FIG. 8 to form the reference voltage generation device of the present invention.

What is claimed is:

1. A reference voltage generation device, comprising:

a constant current circuit which outputs a constant current in response to an input voltage;

a voltage generation circuit which is connected in series to the constant current circuit, uses the constant current as an input current, and generates an output voltage based on the input current; and a reference voltage output port which outputs the output voltage, wherein the constant current circuit comprises a depletion type MOS transistor circuit, and the depletion type MOS transistor circuit has a depletion type MOS transistor circuit total gate width and a depletion type MOS transistor circuit total gate length, the depletion type MOS transistor circuit comprises n (n is an integer 2, 3, 4 . . . ) depletion type MOS transistors, the n depletion type MOS transistors, from a first depletion type MOS transistor to an $n^{th}$ depletion type MOS transistor, are connected in series, the first depletion type MOS transistor has a first gate width and a first gate length, and has a gate and a source connected, the $n^{th}$ depletion type MOS transistor has the first gate width and an $n^{th}$ gate length, and has a drain connected to the input voltage, the voltage generation circuit comprises an enhancement type MOS transistor circuit, and the enhancement type MOS transistor circuit has an enhancement type MOS transistor circuit total gate width and an enhancement type MOS transistor circuit total gate length, the enhancement type MOS transistor circuit comprises m (m is an integer 2, 3, 4 . . . ) enhancement type MOS transistors, the m enhancement type MOS transistors, from a first enhancement type MOS transistor to an $m^{th}$ enhancement type MOS transistor, are connected in series, the first enhancement type MOS transistor has the first gate width and a gate length of the first enhancement type MOS transistor, and has a drain and a gate connected, the $m^{th}$ enhancement type MOS transistor has the first gate width and a gate length of the $m^{th}$ enhancement type MOS transistor, the source of the first depletion type MOS transistor and the drain of the first enhancement type MOS transistor are connected to the reference voltage output port, the first gate width is the depletion type MOS transistor circuit total gate width and the enhancement type MOS transistor circuit total gate width, a sum of the first gate length to the $n^{th}$ gate length is the depletion type MOS transistor circuit total gate length, a sum of the gate length of the first enhancement type MOS transistor to the gate length of the $m^{th}$ enhancement type MOS transistor is the enhancement type MOS transistor circuit total gate length; and wherein the first gate width is 5 μm or less, the first gate length and the $n^{th}$ gate length of the depletion type MOS transistor are 25 μm or less respectively, and the gate length of the first enhancement type MOS transistor and the gate length of the $m^{th}$ enhancement type MOS transistor are 25 μm or less respectively.

2. A reference voltage generation device, comprising:

a constant current circuit which outputs a constant current in response to an input voltage;

a voltage generation circuit which is connected in series to the constant current circuit, uses the constant current as an input current, and generates an output voltage based on the input current; and a reference voltage output port which outputs the output voltage, wherein the constant current circuit comprises a depletion type MOS transistor circuit, and the depletion type MOS transistor circuit has a depletion type MOS transistor circuit total gate width and a depletion type MOS transistor circuit total gate length, the depletion type MOS transistor circuit comprises n (n is an integer 2, 3, 4 . . . )xp(p is an integer 2, 3, 4 . . . ) depletion type MOS transistors, the n depletion type MOS transistors, from a first depletion type MOS transistor to an $n^{th}$ depletion type MOS transistor, in a first column are connected in series, the first depletion type MOS transistor has a first gate width and a first gate length, and has a gate and a source connected, the $n^{th}$ depletion type MOS transistor has the first gate width and an $n^{th}$ gate length, and has a drain connected to the input voltage, n depletion type MOS transistors from a first depletion type MOS transistor to an $n^{th}$ depletion type MOS transistor in a $p^{th}$ column are connected in series, and the depletion type MOS transistors are arranged in parallel from the first column to the $p^{th}$ column, the first depletion type MOS transistor in the $p^{th}$ column has a $p^{th}$ gate width and the first gate length, and has a gate and a source connected, the $n^{th}$ depletion type MOS transistor in the $p^{th}$ column has the $p^{th}$ gate width and the $n^{th}$ gate length, and has a drain connected to the input voltage, the voltage generation circuit comprises an enhancement type MOS transistor circuit, and the enhancement type MOS transistor circuit has an enhancement type MOS transistor circuit total gate width and an enhancement type MOS transistor circuit total gate length, the enhancement type MOS transistor circuit comprises m (m is an integer 2, 3, 4 . . . ) x p (p is an integer 2, 3, 4 . . . ) enhancement type MOS transistors, the m enhancement type MOS transistors, from a first enhancement type MOS transistor to an $m^{th}$ enhancement type MOS transistor, in a first column are connected in series, the first enhancement type MOS transistor has the first gate width and a gate length of the first enhancement type MOS transistor, and has a drain and a gate connected, the $m^{th}$ enhancement type MOS transistor has the first gate width and a gate length of the $m^{th}$ enhancement type MOS transistor, m enhancement type MOS transistors from a first enhancement type MOS transistor in a $p^{th}$ column to an $m^{th}$ enhancement type MOS transistor are connected in series, and the enhancement type MOS transistors are arranged in parallel from the first column to the $p^{th}$ column, the first enhancement type MOS transistor in the $p^{th}$ column has the $p^{th}$ gate width and the first gate length, and has a gate and a source connected, the source of the first depletion type MOS transistor in the first column, the drain of the first enhancement type MOS transistor in the first column, a source of the first depletion type MOS transistor in the $p^{th}$ column, and a drain of the first enhancement type MOS transistor in the $p^{th}$ column are connected to the reference voltage output port, a sum of the first gate width to the $p^{th}$ gate width is the depletion type MOS transistor circuit total gate width and the enhancement type MOS transistor circuit total gate width, a sum of the first gate length to the $n^{th}$ gate length is the depletion type MOS transistor circuit total gate length, and a sum of the gate length of the first enhancement type MOS transistor to the gate length of the $m^{th}$ enhancement type MOS transistor is the enhancement type MOS transistor circuit total gate length.

3. The reference voltage generation device according to claim 2, wherein the first gate width and the $p^{th}$ gate width are 5 μm or less respectively, the first gate length and the $n^{th}$ gate length of the depletion type MOS transistor are 25 μm or less respectively, and the first gate length and the $m^{th}$ gate length of the enhancement type MOS transistor are 25 μm or less respectively.

* * * * *